April 26, 1960 W. E. BELLER ET AL 2,934,618
FLUID PRESSURE RESPONSIVE SWITCH
Filed July 11, 1955 2 Sheets-Sheet 1

Inventors
Irving Gebel
Wilbert E. Beller

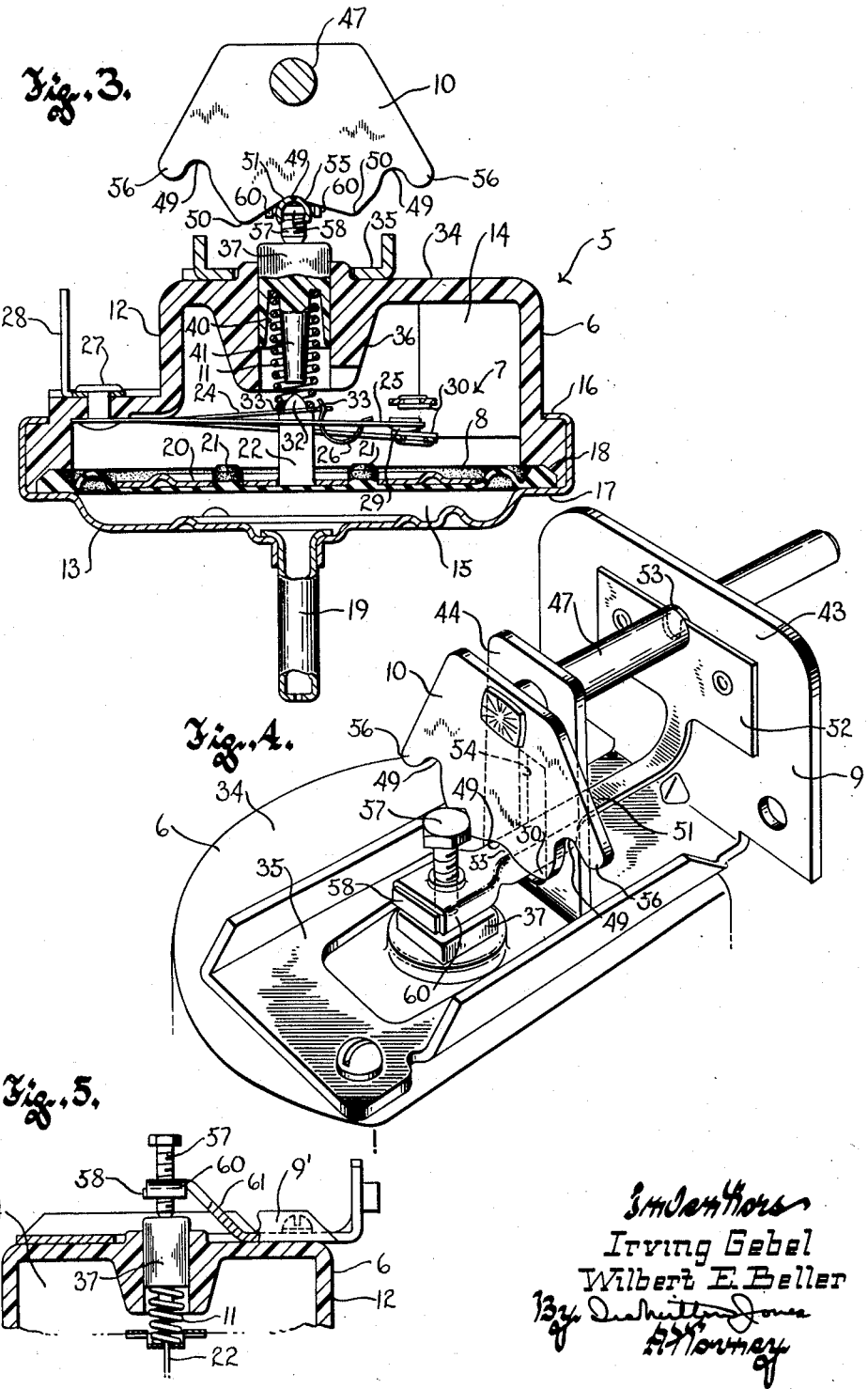

United States Patent Office 2,934,618
Patented Apr. 26, 1960

2,934,618

FLUID PRESSURE RESPONSIVE SWITCH

Wilbert E. Beller, Park Ridge, and Irving Gebel, Oak Park, Ill., assignors to Controls Company of America, Schiller Park, Ill., a corporation of Delaware Application July 11, 1955, Serial No. 520,946

13 Claims. (Cl. 200—83)

This invention relates to fluid pressure responsive devices and refers more particularly to an electric switch which is actuated to its switch-on and switch-off positions in consequence of variations in the pressure of a fluid.

Fluid pressure responsive mechanisms of the type here under consideration are particularly useful in automatic washing machines, where they are employed for the control of electrical circuits which govern flow of water into the washing chamber to automatically effect filling to predetermined liquid level. In such installations fluid pressure responsive devices must operate with good precision under rather unfavorable conditions. Obviously a pressure responsive electric switch for a clothes washer should be as inexpensive as possible, and this means it must embody relatively few and simple parts which can be quickly and easily assembled, must be rugged enough to stand up under rough handling during shipment without special packing, and must be readily adjustable on the assembly line to operate within closely specified limits. Moreover, despite the usual precautions in design and workmanship of the washing machine, the device will almost inevitably be exposed to a certain amount of foreign matter, such as dirt, lint, water and soap scum, which, if permitted to accumulate on certain of its moving parts, would seriously affect the accuracy of its response if not render it completely inoperative. Hence the moving parts of the device should be so designed and arranged that such foreign matter will not interfere with its operation.

With these requirements in mind, it is an object of this invention to provide a fluid pressure responsive mechanism which is unusually compact and in which all of the delicate parts of the mechanism that are most susceptible to the effects of foreign matter and rough handling are enclosed within a housing, while those moving parts which are exposed at the exterior of the housing are such as are inherently rugged and unlikely to be adversely affected by foreign matter or abuse.

In fluid pressure responsive switches used in clothes washing machines and the like it is frequently necessary to provide manual adjusting means by which the switch may be made to respond to any of several different pressure values. Such adjustment is usually provided for by means of a cam cooperating with a cam follower which is connected either with a fixed switch contact or with a return spring reacting against a pressure responsive element. Ordinarily the cam has several predetermined positions, defined by detents, each of which corresponds to a water level to be maintained in the washing chamber or to some similar value. A mechanism of this type is disclosed in the copending application of Irving Gebel, Serial No. 487,880, filed February 14, 1955 (now Patent No. 2,737,826), wherein the cam is carried by a shaft journaled in flanges on the mounting bracket for the device, and a spring finger, mounted on the same bracket, cooperates with lobes on the cam to define indexing detents.

The present invention has for another of its objects to provide a pressure responsive mechanism wherein a spring finger, which cooperates with the lobes on a cam to afford indexing detent action, also has a connection with the return spring to enable the same cam lobes which effect indexing to also effect regualtion of the compressive force upon the return spring.

Another object of this invention resides in the provision of a fluid pressure responsive mechanism wherein an indexing cam provides for adjustment of the mechanism to respond to any one of a plurality of predetermined pressure values, and wherein precise adjustment of pressure response may be effected by means of an adjusting screw readily accessibly carried at the end of a spring finger, which spring finger also serves to define detents marking the positions of adjustment of the cam and as a cam follower by which rotation of the cam is translated into compression or relaxation of the return spring.

Still another object of this invention resides in the provision of a fluid pressure responsive mechanism of the character described wherein a single coiled compression return spring controls pressure response of the device, and wherein said return spring is enclosed within the housing of the unit and is supported in such a manner that its convolutions are held coaxial to preclude buckling of the spring which would cause it to produce varying or inconsistent reactions.

Another and very important object of this invention resides in the provision of a pressure responsive switch of the character described wherein the switch is automatically reset each time the device is manually adjusted to a new pressure response value, so that the switch will effect positive control when readjusted from a lower control pressure value to a higher control pressure value. Assuming the device is employed to control water level in a washing machine and has been set to a low water level position, if the normal low water level has been reached and the switch has been tripped to stop further flow of water into the machine, the switch in the device of this invention will be positively reset to initiate further flow of water into the machine if the device is thereafter reset to a position corresponding to a higher water level.

In this connection it is also an object of this invention to provide an adjustable fluid pressure responsive device, such as an electric switch or the like, wherein the indexing cam by which fluid pressure response is adjusted also serves to effect positive resetting of the device each time the cam is moved from one of its index positions to another.

Another object of this invention is to provide a fluid pressure responsive device which is so constructed that it may be modified to provide either a fixed level switch or a variable level switch without any change in the basic structure.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate two complete examples of the physical embodiments of the invention constructed according to the best modes so far devised for the practical application of the principles thereof, and in which:

Figure 3 is a view similar to Figure 2 but showing the switch in what may be considered its open position, which it assumes in response to fluid pressure on the diaphragm;

Figure 4 is a fragmentary perspective view of the device shown in Figure 1, viewed from above and to one side; and Figure 5 is a fragmentary sectional view of a modified embodiment of the invention.

Figure 1:
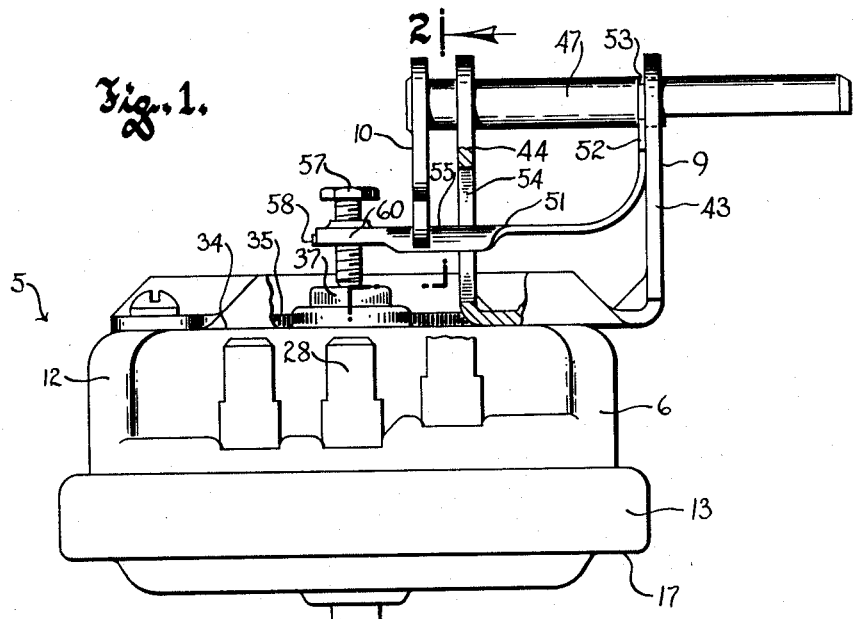
Figure 1 is a side elevational view of a fluid pressure responsive switch device embodying the principles of this invention.

Referring now more particularly to the accompanying drawings, in which like numerals designate like parts throughout the several views, the numeral 5 designates generally a fluid pressure responsive device comprising a housing 6 which encloses a snap-acting switch mechanism 7 or other device to be actuated in response to changes in pressure exerted on the under side of a resilient diaphragm 8 mounted in the bottom portion of the housing. A bracket 9 on the housing provides for mounting of the device and also supports an indexing cam 10 by which the compressive force upon a return spring 11 may be regulated.

More specifically, the housing 6 comprises an upper cup-like insulative body portion 12, open at its bottom, and a closely fitting metal cover 13 closing the open bottom of the body portion. The resilient diaphragm 8 extends laterally across the interior of the housing and has its peripheral portion clamped between the cover and the rim portion of the cup-like body, thus dividing the housing into two compartments, namely an upper switch mechanism compartment 14 in which is housed the control device that is actuated by the diaphragm and a lower pressure compartment 15 in which air, water or other fluid is received to have contact with one face of the diaphragm.

The cover fits snugly around the body portion of the housing and is crimped or rolled over an annular upwardly facing shoulder on the exterior of the body, as at 16, so as to be held securely in place. The cover also has an upwardly facing circumferential shoulder 17 which engages a circumferential bead 18 on the edge of the diaphragm so as to engage the same under pressure and thus assure a good seal for the pressure compartment. A nipple 19 secured in the cover and projecting downwardly therefrom facilitates connection in any suitable fashion of the pressure compartment with the washing chamber or other vessel in which fluid level or pressure is to be controlled.

A rigid disk 20, smaller in diameter than the diaphragm, flatwise overlies the central portion thereof and is held in position by a pair of integral tits 21 projecting upwardly from the upper face of the diaphragm through closely fitting holes in the disk. Struck out of the disk is an integral post or stud 22 which extends upwardly from the center of the disk to connect the diaphragm with the switch mechanism.

The switch mechanism 7, which is illustrative of the type of control mechanism with which the device of this invention is adapted to be used, is a conventional overcenter snap switch having an actuator arm 24 mounted for up and down swinging motion and connected for snap actuation with a contact carrying arm 25 by means of a U-shaped overcenter spring 26. The actuator arm and contact carrying arm extend in the same direction, being preferably formed as integral parts of a single piece of spring metal, and are secured to one side of the housing body, as by means of a rivet 27 which also secures a terminal lug 28. Both the construction and mode of operation of this switch are too well known to require detailed description; suffice it to say that as the actuator arm is swung upwardly or downwardly, energy is stored in the U-shaped overcenter spring and released with a snap action as the actuator moves through a critical position in which it is substantially coplanar with the contact carrying arm, thus snapping the movable contact 29 carried by the contact carrying arm from engagement with one to the other of the stationary contacts 30 with which it cooperates, the contact carrying arm moving in a direction opposite to the actuator arm.

The post or stud 22 has a pointed reduced free end portion 32 defining shoulders 33 flanking the same, and this reduced end portion of the post projects through a narrow locating slot in the actuator arm, which slot is directly above the central zone of the diaphragm. Thus the post is mounted for a limited degree of universal motion which compensates for any possible misalignment between the disk and the slot in the actuator and accommodates the relative rocking movement between the post and the actuator arm, and the post connects the diaphragm with the actuator blade in such a manner that upward flexing of the diaphragm is transmitted to the actuator, constraining the diaphragm and actuator to move in unison.

The structure described to this point corresponds substantially to that disclosed in the copending application of Edgar M. Soreng and Irving Gebel, Serial No. 298,873, filed July 14, 1952, to which reference may be made for a more detailed description.

The body portion of the housing has a substantially uniplanar top wall 34, which the base 35 of the bracket flatwise overlies and from which an integral boss 36 projects downwardly into the interior of the housing. A plunger 37 having a non-circular cross section is slidably guided for lengthwise up and down movement in a correspondingly shaped bore in the boss, and a coiled compression return spring 11 is confined between the plunger and the actuator arm. The position of the plunger along its path of reciprocation is adjustably determined by means of the cam, as will appear presently, and the plunger, in turn, imposes more or less compressive force upon the return spring to thus regulate the amount of pressure which must be imposed upon the lower face of the diaphragm to swing the actuator arm past its critical position.

If the spring were permitted to buckle under compression—that is, if the axes of its convolutions were permitted to lie along a curved line—its compressive force might not remain constant, hence the spring is supported in such a manner as to insure that its convolutions will at all times remain substantially coaxial. To this end the plunger has a relatively deep downwardly opening well 40 in which the uppermost convolutions of the spring are nested, while the lower convolutions encircle the reduced upper end of the post. While the spring is thus to some extent constrained against lateral motion out of coaxiality with the plunger and the post, further assurance against buckling of the spring is provided by a rigid pilot-like downward projection 41 on the plunger which has its base at the bottom of the well, coaxial therewith, and which projects downwardly into the spring a substantial distance below the body of the plunger to be encircled by a substantial number of the spring convolutions. The non-circular cross section of the plunger further assures that the spring will exert uniform forces under each condition of adjustment because the plunger cannot rotate and thus impose unwanted torque upon the spring.

The mounting bracket comprises upstanding front and rear flanges 43, 44 which are integral with the base portion 35 of the bracket, the rear flange 44 being located near the boss in which the plunger is mounted while the front flange 43 is remote from said boss and projects beyond the widest diameter of the housing to provide for mounting the device on a panel or the like. The opening left in the base of the bracket by striking up the rear flange 44 therefrom thus provides access to the upper end of the plunger from the top of the housing from which the plunger normally projects. Rotatably journaled in aligned apertures in the two flanges is a shaft 47 which is substantially parallel to and spaced above the uniplanar top wall of the body. The front end portion of the shaft projects beyond the front mounting flange 43 to have a suitable manual actuator (not shown) mounted thereon, while the cam 10 is non-rotatably mounted on the rear end portion of the shaft which projects beyond the rear flange 44.

The cam has a plurality of circumferentially spaced detent depressions 49 in its lower edge portion, separated and defined by projecting lobes 50. A unitary spring finger 51 cooperates with the cam to provide a detent indexing cam follower and a connection with the plunger whereby the latter is positioned in accordance with the position of the cam. The spring finger is stamped from resilient metal and has an upturned attaching base 52 which is riveted or otherwise secured to the front flange of the bracket flatwise overlying the inner face of the same. In addition to the functions already mentioned, the spring finger also serves to confine the shaft against endwise displacement by reason of the engagement of an edge portion of its base in a circumferential groove 53 in the shaft.

The medial portion of the spring finger projects through a vertically elongated slot 54 in the rear flange 44 to constrain the free end portion of the spring finger to up and down motion, and it is curved to a substantially arcuate cross section to provide for smooth guiding engagement with the edge portions of the slot and to form a cam follower portion 55 which cooperates with the lobes and depressions on the cam. Since the spring finger is held against lateral motion by the sides of the slot in the rear flange 44, it may also provide a rotation stop for the operating shaft. For this purpose the endmost depressions in the cam have abrupt outer sides 56 over which the cam follower portion of the spring finger cannot ride. In this connection it should be noted that the arcuate or channel-like cross section of the rear portion of the spring finger renders it sufficiently rigid to enable it to resist lateral forces which may be exerted thereon by any attempt to rotate the cam past its stop. It will of course be understood that the spring finger is disposed below the shaft substantially parallel thereto and has its free end portion biased upwardly to insure yielding engagement with the cam surface, so that as the cam follower portion of the spring finger nests upwardly into each of the depressions in the cam surface it releasably holds the cam against rotation with a pronounced detent action.

The bottoms of the several depressions 49 in the cam surface are disposed at different radial distances from the shaft axis, so that when the cam is rotated from one depression to another the free end of the spring finger will be situated at different elevations above the base of the bracket and the top wall of the body. Rotation of the cam from one defined position to another effects adjustment of the tension on the return spring 11 through an upright adjusting screw 57 threaded into the free end portion of the spring finger and having its lower end bearing directly upon the top of the plunger. A fibre lock nut 58 is clinched between down turned flanges 60 on the sides of the spring finger to preclude inadvertent rotation of the adjusting screw.

The amount of compression to which the spring is subjected is thus determined by the position of the plunger, and this, in turn, is governed by the position at which the spring finger is held by the cam and the extent to which the set screw 57 is advanced or retracted. Hence the pressure required to swing the actuator arm past its critical position may be selected by rotation of the cam and may be precisely adjusted by setting the adjusting screw.

As the device is reset by rotation of the cam from one position to another, it is highly desirable to have the switch mechanism automatically reset. This is accomplished in the switch of this invention at the times the cam lobes ride onto the cam follower, causing the plunger to be temporarily depressed a distance greater than the normal spacing between the lower end of its pilot portion and the reduced upper end portion of the post 22, so that the diaphragm will be pressed downwardly against the force exerted thereon by fluid in the pressure chamber and the actuator arm will be moved downwardly past its critical position by the return spring 11.

Figure 2:
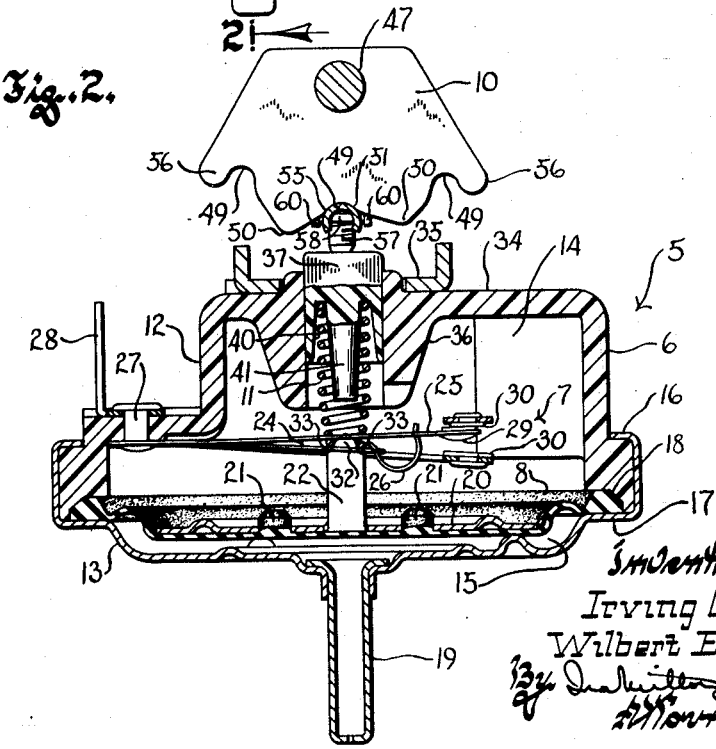
Figure 2 is a sectional view taken on the plane of the line 2—2 in Figure 1, with the switch mechanism shown in what may be considered its closed position.

Attention is directed to the fact that the indexing and adjusting mechanism is carried by a single bracket which also serves to mount the device and may therefore be subassembled entirely independently of the pressure switch per se. In installations where a variable level control is not required and a fixed level switch will suffice, the switch per se of this invention can be used without any change, as long as a stop is provided for the plunger. As shown in Figure 5, this stop can be formed on a small mounting bracket 9′, which may be interchangeably substituted for the bracket 9 of the switch shown in Figures 1 to 4, the base portions of the two brackets being substantially identical. The stop is provided by an arm 61 struck up from the base of the bracket with its free end portion overlying the plunger, and having the adjusting screw 57 threaded downwardly therethrough to have its bottom bear against the top of the plunger. Thus with the device of this invention it is no longer necessary to provide different switches for fixed and variable level service.

The switch structure shown herein is claimed in our copending application Serial No. 522,206, filed July 15, 1955, for "Snap Action Switch."

From the foregoing description, taken together with the accompanying drawings, it will be apparent that this invention provides an unusually simple and compact fluid pressure responsive mechanism wherein all of the delicate parts are enclosed within the housing to be protected from rough handling and foreign matter, leaving only the comparatively rugged parts exposed, and wherein an indexing cam regulates the pressure value to which the device responds and positively resets the mechanism to be actuated whenever the cam is repositioned to provide a different pressure response value.

We claim:

1. In a pressure responsive device comprising a housing and a diaphragm mounted in the bottom portion of the housing for up and down flexing in response to changes in pressure exerted upon the underside of the diaphragm: an actuator mounted in the housing above the diaphragm for up and down motion past a critical position; a plunger mounted in the housing over the actuator for endwise up and down sliding movement and having a downwardly facing abutment, the upper end of the plunger being accessible at the top of the housing; a compression spring confined between the abutment on the plunger and the actuator for biasing the actuator downwardly toward the diaphragm; means connected between the actuator and the diaphragm for translating upward flexure of the latter into upward motion of the actuator; a cam mounted on the exterior of the housing for rotation on a fixed axis and having alternating circumferentially spaced lobes and depressions of different depths; means providing a cam follower engaged with said cam and connected with the plunger for translating rotation of the lobes of the cam past the cam follower into endwise movement of the plunger to a lowermost resetting position and whereby the plunger is retained in various positions of adjustment in which it relieves the spring by different amounts when said cam follower is engaged in the depressions in the cam; and means on the plunger for relieving the actuator from force exerted thereon by the diaphragm whenever the plunger is moved to its lowermost resetting position.

2. The pressure responsive device of claim 1 wherein said compression spring is a coiled spring and has its uppermost convolutions encircling a downward projection on the plunger so that said plunger affords steadying guidance to the spring whereby its convolutions are held coaxial.

3. In a pressure responsive device of the type comprising a housing having a diaphragm mounted in its bottom portion for up and down flexing in response to changes in pressure exerted upon the underside of the diaphragm, and an actuator mounted in the housing above the diaphragm for up and down swinging motion past a critical position and connected with the diaphragm to move upwardly in unison therewith: a plunger on the housing over the actuator mounted for endwise up and down sliding movement in a hole in the housing opening to its top; a spring confined under compression between the plunger and the actuator for biasing the actuator downwardly and the plunger upwardly; a mounting bracket on the exterior of the housing having a pair of spaced apart upstanding flanges, one near the upper end of the plunger and the other remote therefrom; a shaft rotatably journaled in said flanges and spaced above the top of the housing; a cam fixed on said shaft and having a peripheral cam surface; a resilient spring finger secured at one end to said flange of the bracket remote from the plunger and projecting through a slot in the other flange to be guided thereby for up and down flexing motion, said finger having a cam follower portion below the shaft and biased upwardly into engagement with said peripheral cam surface on the cam, another portion of said finger overlying the upper end of said plunger; a set screw adjustably secured in said other portion of the spring finger and bearing upon the upper end of the plunger to transmit cam actuated flexing motion of said spring finger to the plunger, to thereby impose compressive force upon said spring, through the plunger, in accordance with the position to which the cam is rotated and the position of adjustment of the set screw; and means on the plunger for moving the actuator downwardly past its critical position whenever the plunger is moved to its lowermost resetting position.

4. The pressure responsive device of claim 3 wherein the cam surface of the cam is defined by circumferentially spaced lobes and has depressions between the lobes, said lobes and depressions being cooperable with the spring finger to define indexing detents, the bottoms of the depressions being spaced different radial distances from the shaft axis to hold the plunger in different positions of up and down adjustment in the various detent defined positions of the cam.

5. The pressure responsive device of claim 1 in which the means on the plunger for relieving the actuator from force exerted thereon by the diaphragm includes a rigid part on the plunger projecting downwardly therefrom beyond the lower end of the plunger in line with but normally spaced slightly above a part connected with said actuator when the cam is in one of said detent defined positions thereof.

6. In a control instrumentality of the type having a housing, a switch mounted in the housing and including an actuating arm biased in one direction by a coiled compression spring to normally maintain said switch in one position and pressure responsive actuating means for moving said actuating arm in the opposite direction to effect actuation of the switch to another position in response to the exertion of a predetermined pressure upon the pressure responsive actuating means, means for adjusting the force which said compression spring exerts upon the actuating arm so as to enable the switch to be operated by said actuating means in response to different pressures, comprising: a plunger slidably received in a hole in one wall of the housing and against which said compression spring reacts, said plunger having a non circular cross-section and the hole in the housing in which the plunger is slidably guided having a corresponding non-circular section so as to preclude rotation of the plunger in its hole, one end of said plunger projecting through said wall of the housing to the exterior thereof; and adjustable means mounted on said wall of the housing at its exterior and bearing upon the exposed end of the plunger to provide for adjusting the same axially in its hole to thus regulate the force of the compression spring confined between the plunger and said actuating arm.

7. A pressure responsive control instrumentality of the type having a housing, a snap switch in the housing including an actuating member movable in one direction past a critical position to snap the switch from one position to another, pressure responsive actuating means connected with said actuating member to impart switch operating motion thereto in said direction, and a coiled compression return spring confined between said actuating member and a part on the housing to yieldingly resist motion of the actuating member in said direction and for imparting motion thereto in the opposite direction when the pressure upon said pressure responsive actuating means is relieved, characterized by the fact that: said part on the housing comprises a plunger of non-circular cross section axially slidably but nonrotatably received in a corresponding non-circular hole in the housing with one end portion of the plunger projecting therefrom and exposed at the exterior of the housing; and that the housing has regulating means mounted on its exterior and bearing upon said exposed end of the plunger for adjustably determining the axial position of the plunger in its hole and thus for regulating the force which said spring exerts on the actuating member; further characterized by the provision of means on said regulating means for momentarily imparting overtravel to the plunger in the direction to further compress said spring as a consequence of adjustment of the axial position of the plunger from one position to another; and further characterized by the provision of means comprising a rigid part on the plunger projecting downwardly therefrom beyond the lower end of the plunger to impart downward swinging of the actuator past its critical position whenever the plunger is moved to a lowermost position as a consequence of adjustment of the axial position of the plunger.

8. A manually adjustable condition responsive device operated in accordance with a condition comprising: a housing having a top wall with a hole therethrough opening to the top of the housing, control means in said housing, an actuator in said housing movable to operate said control means in response to a change in said condition, a plunger slidably guided in said hole for endise up and down motion, a spring confined under compression between said plunger and said actuator, and cam means mounted on the outside of said top wall of said housing, said cam means acting on said plunger and manually operable to different positions to adjust the force exerted by said plunger on said actuator, the force exerted by said plunger on said actuator being different in different positions of said cam means.

9. A manually adjustable condition responsive device operated in accordance with a condition, comprising: control means, a member movable to operate said control means in response to a change in said condition, loading means exerting a force on and opposing movement of said member in one direction, cam means manually operable to different positions to adjust the force exerted by said loading means on said member, the force exerted by said loading means on said member being different in different positions of said cam, and resetting means, operated by said cam means as said cam means is manually operated between its different positions, to operate said control means.

10. A manually adjustable condition responsive device operated in accordance with a condition, comprising: control means, a member movable to operate said control means in response to a change in said condition, loading means exerting a force on and opposing movement of said member in one direction, a single multiple position cam manually operable to different positions thereof to adjust the force exerted by said loading means on said member, the force exerted by said loading means on said member being different in different positions of said cam, and a reset member, operated by said single cam when and as it is manually moved between its multiple positions, to operate said control means.

11. A manually adjustable condition responsive device operated in accordance with a condition, comprising: control means, a member movable to operate said control means in response to a change in said condition, loading means adapted to exert a force opposing movement of said member in one direction, an adjusting lever pivotally moveable to determine the force exerted by said loading means, a multiple position cam cooperable with said lever and manually operable to adjust the position of said lever and consequently the force exerted by said loading means, and a reset member, operated by said lever as said cam is moved between said multiple positions, to operate said control means.

12. A manually adjustable condition responsive device operated in accordance with a condition, comprising; control means, a member movable to operate said control means in response to a change in said condition, loading means exerting a force on and opposing movement of said member in one direction, a single multiple position cam operatively connected to said loading means and manually operable to different positions to adjust the force exerted by said loading means on said member, the force exerted by said loading means on said member being different in different positions of said cam, and a reset member operatively connected to said cam and operated thereby when and as the cam is manually moved between its multiple positions, to operate said control means.

13. The combination according to claim 9 in which said resetting means includes a plunger normally spaced from said member, said plunger being moved by the cam means against said member during resetting.

References Cited in the file of this patent

UNITED STATES PATENTS

| | | |
|---|---|---|
| 1,710,859 | Burks | Apr. 30, 1929 |
| 2,390,145 | Graves | Aug. 20, 1943 |
| 2,541,643 | Dusinberre et al. | Feb. 13, 1951 |
| 2,595,967 | McCloy | May 6, 1952 |
| 2,636,093 | Clark et al. | Apr. 21, 1953 |
| 2,681,221 | Randol | June 15, 1954 |
| 2,720,564 | Lorenz et al. | Oct. 11, 1955 |
| 2,813,944 | Tyzack | Nov. 19, 1957 |